(12) United States Patent
Choquette

(10) Patent No.: US 7,188,232 B1
(45) Date of Patent: Mar. 6, 2007

(54) PIPELINED PROCESSING WITH COMMIT SPECULATION STAGING BUFFER AND LOAD/STORE CENTRIC EXCEPTION HANDLING

(76) Inventor: Jack H. Choquette, 822 Tulane Dr., Mountain View, CA (US) 94040

( * ) Notice: Subject to any disclaimer, the term of this patent is extended or adjusted under 35 U.S.C. 154(b) by 0 days.

(21) Appl. No.: 09/564,715

(22) Filed: May 3, 2000

(51) Int. Cl.
*G06F 9/38* (2006.01)
(52) U.S. Cl. ...................... 712/218; 712/244
(58) Field of Classification Search ............... 712/215, 712/218, 219, 225, 244
See application file for complete search history.

(56) References Cited

U.S. PATENT DOCUMENTS

| | | | | |
|---|---|---|---|---|
| 5,524,224 A | * | 6/1996 | Denman et al. | 712/219 |
| 5,651,124 A | * | 7/1997 | Shen et al. | 712/215 |
| 5,717,883 A | * | 2/1998 | Sager | 712/218 |
| 5,809,268 A | * | 9/1998 | Chan | 712/200 |
| 5,915,117 A | * | 6/1999 | Ross et al. | 710/262 |
| 6,542,988 B1 | * | 4/2003 | Tremblay et al. | 712/225 |
| 2002/0152259 A1 | * | 10/2002 | Trong et al. | 709/201 |

* cited by examiner

Primary Examiner—Kenneth S. Kim
(74) Attorney, Agent, or Firm—Stevens Law Group

(57) ABSTRACT

A load/store centric exception handling system provided in accordance with the principles of this invention that provides a more efficient processor exception handling system wherein a speculative commit control signal (SpecComId) is generated whenever a load or store instructions is detected by the pipeline issuing unit (PIU). This speculative commit signal is sent to a Load Store Unit (LSU) which combines the SpecComID with the completed instructions in its pipeline to generate an actual commit signal (ComId) that is coupled to other processor units. Depending on what type of instructions are in the pipeline, SpecComID can be generated as early as Q stage or as late as C stage. LSU or Exc Free instructions can be speculatively committed in Q stage to move the speculative commit point up in processor pipeline. Exc Taking instructions speculatively commit in the C stage to move the speculative commit point down pipeline.

10 Claims, 4 Drawing Sheets

PIPELINED PROCESSING WITH COMMIT SPECULATION STAGING BUFFER AND LOAD/STORE CENTRIC EXCEPTION HANDLING

BACKGROUND

This invention relates to the field of processor architectures, particularly to methods of exception handling.

Maintaining a precise exception handling model in processors is increasingly difficult as processor designs implement deeper pipelines and out of order executions in increasingly higher performance processor designs. The Load/Store Unit (LSU) centric instruction commit is built around the LSU's special needs. Typically, the LSU is not able to determine its exceptions until the end of the D stage when it has almost completed its execution. For store instructions, the LSU needs to know that the store has completed before it executes the store and modifies the cache.

A typical load/store unit instruction is committed at a late processor architecture pipeline stage. There is therefore a corresponding increasing need to simplify exception processing to gain back higher performance exception handling processing in the more complicated deeper pipelines of out of order executions.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

A load/store centric exception handling system is provided in accordance with the principles of this invention that provides a more efficient processor exception handling system wherein a commit speculation control signal (SpecComId) is generated whenever a load or store instructions is detected by the pipeline issuing unit (PIU). This commit speculation control signal is sent to a Load Store Unit (LSU) which combines the SpecComID with the completed instructions in its pipeline to generate an actual commit signal (ComId) that is coupled to other processor units. Depending on what type of instructions is in the pipeline, SpecComID can be generated as early as Q stage or as late as C stage. LSU or Exc Free instructions can be committed speculatively in Q stage to move the commit speculation point up in processor pipeline. Exc Taking instructions commit speculatively in the C stage to move the commit speculation point down pipeline. Since Exc Taking instructions, or Non-LSU instructions, are rare in normal execution, the commit speculation point will tend to stay in Q stage.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

Figure 1:
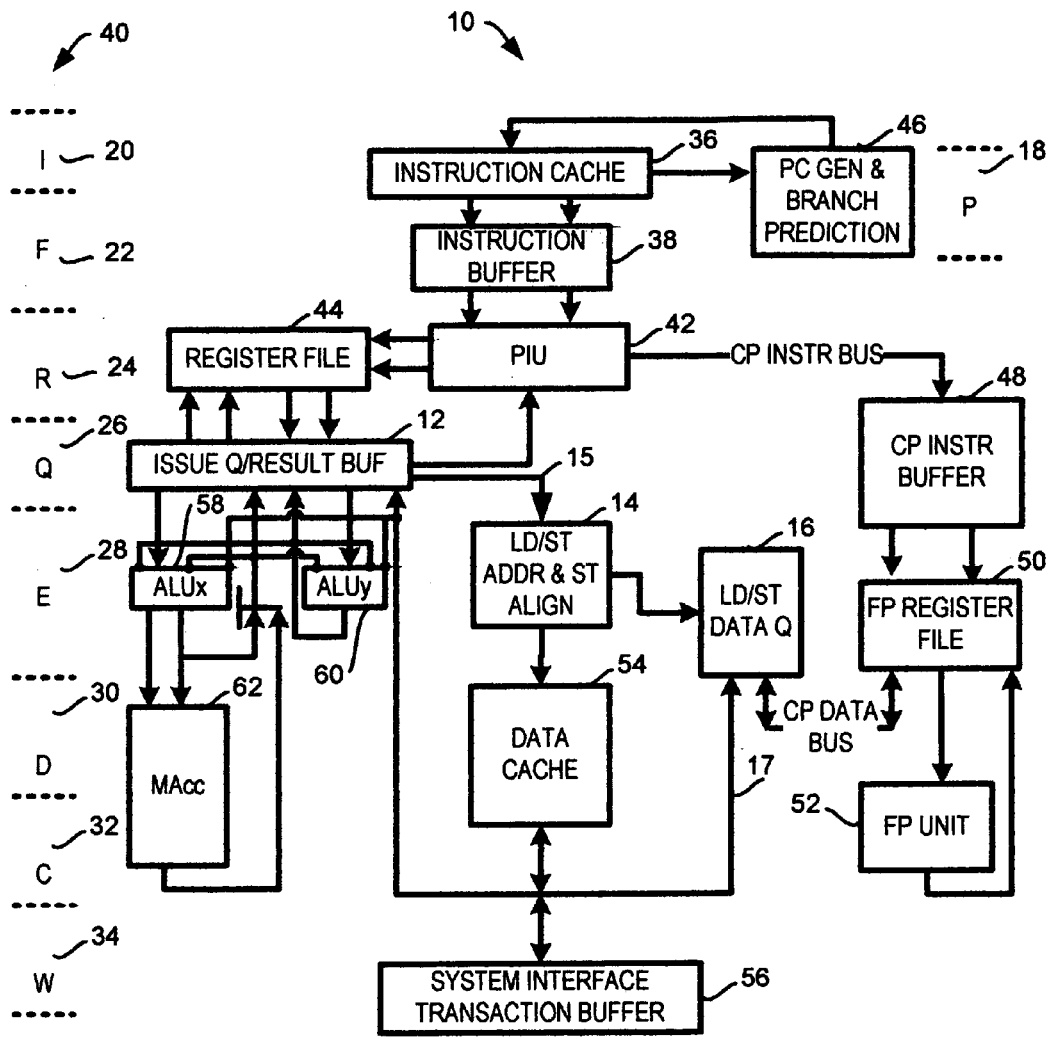
FIG. 1 shows, in an embodiment, a simplified block diagram of a load/store centric exception handling system and method according to the principles of this invention.

FIG. 1 illustrates a simplified block diagram of a load/store centric exception handling system and method according to the principles of this invention. A load/store centric exception handling system 10 may have a pipeline 40 with various stages (stage P 18, stage I 20, stage F 22, stage R 24, stage Q 26, stage E 28, stage D 30, stage C 32, and stage W 32).

For the convenience of reference and explanation, the following denotations are used in the following description:

Stage P: Generation of the PC
Stage I/F: Instruction Cache access
Stage R: Register file access, register rename
Stage Q: Instruction queued for execution
Stage E: Instruction execute ($1^{st}$ cycle). For load/store pipe address generation
Stage D/C: Instruction execute ($2^{nd}$ & $3^{rd}$ cycles). For load/store pipe Data Cache access.
Stage C: Commit instruction
Stage W: Write instruction into register file.

Provided below are also a few definitions of terms that are helpful to describe the pipeline flow:

Fetched: An instruction is fetched if it has been read out of the instruction cache.

Feed/Fed: Instruction is read out of the instruction buffer and sent to the Pipeline & Issuing Unit (PIU).

Issued: Instruction has left the R stage.

Dispatched: Instruction has left the Q stage and given to the data path with its operands to be executed.

Complete: Instruction has finished execution and its results are available.

Commit: Instruction has been committed to the architecture state of the machine. The register file is updated and any exceptions are resolved. From a software point of view, the instruction has finished.

Exception (Exc) Free: suction type that does not cause exceptions.

Exception (Exc) Taking: Instruction type that can cause an exception.

Figure 3:
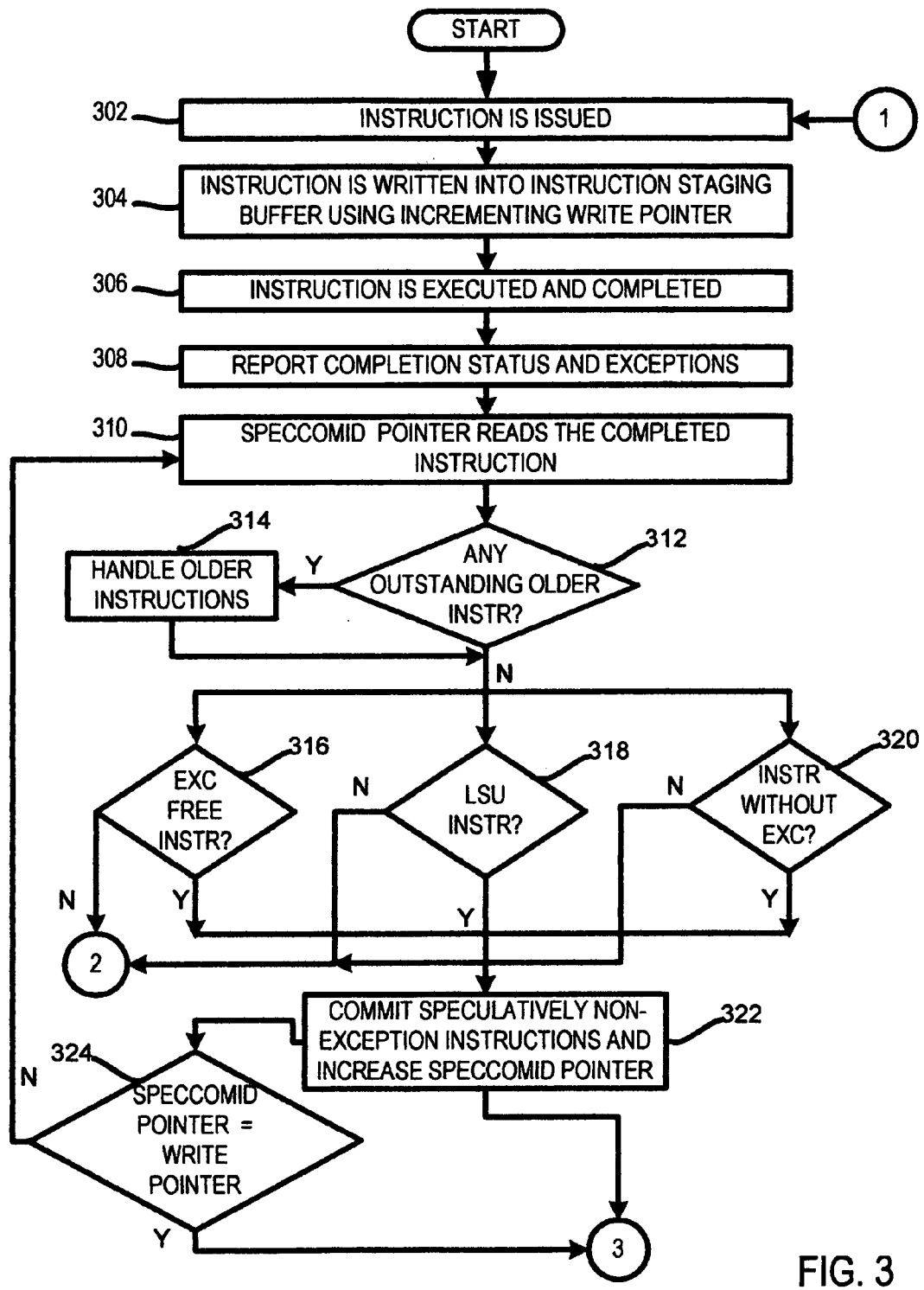
FIGS. 3 and 4 show, in embodiments, a simple flow chart illustrating the creation of a SpecComId and a ComId.
Figure 4:
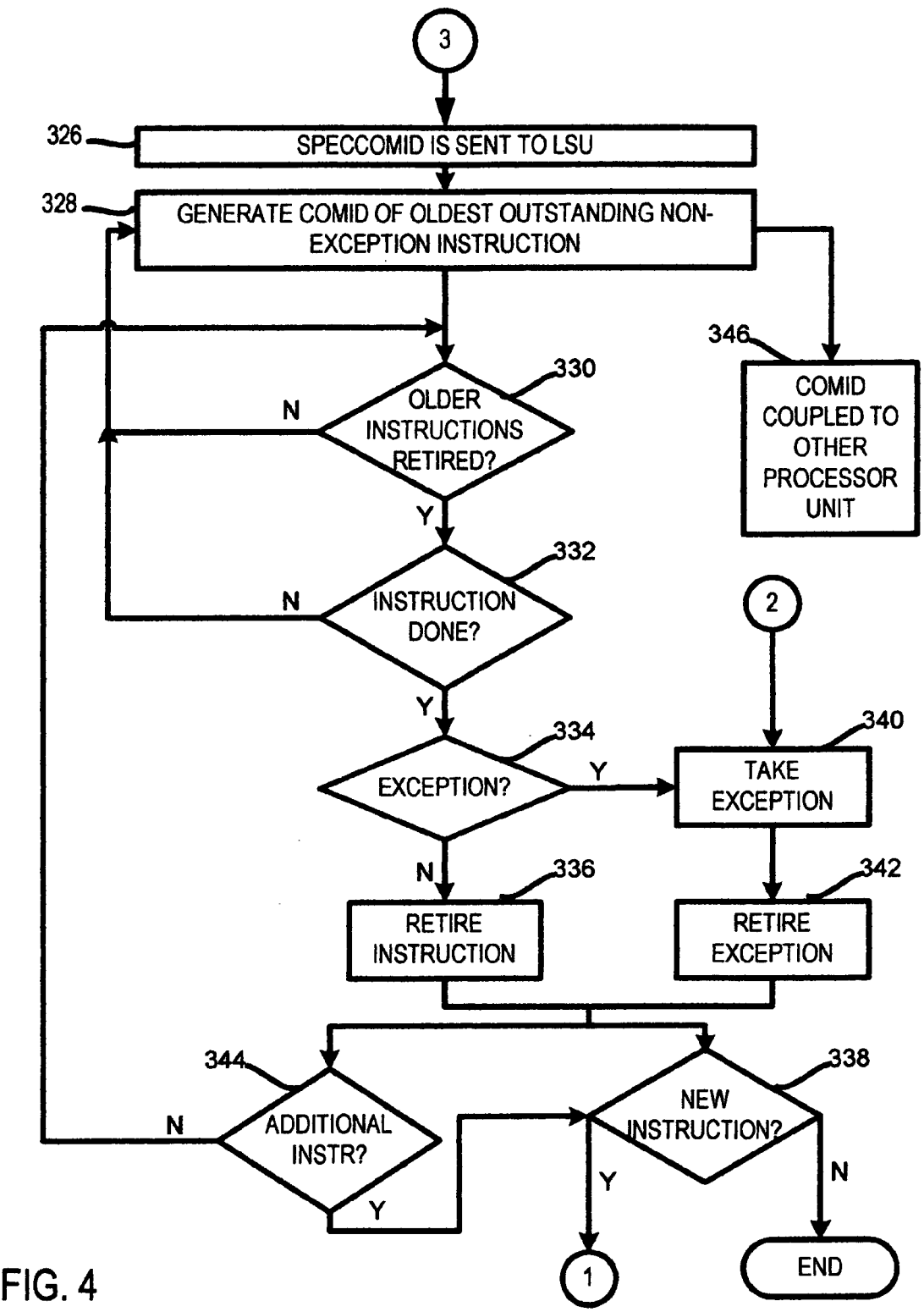

FIG. 1 will be discussed in relation to FIGS. 2–4.

Figure 2:
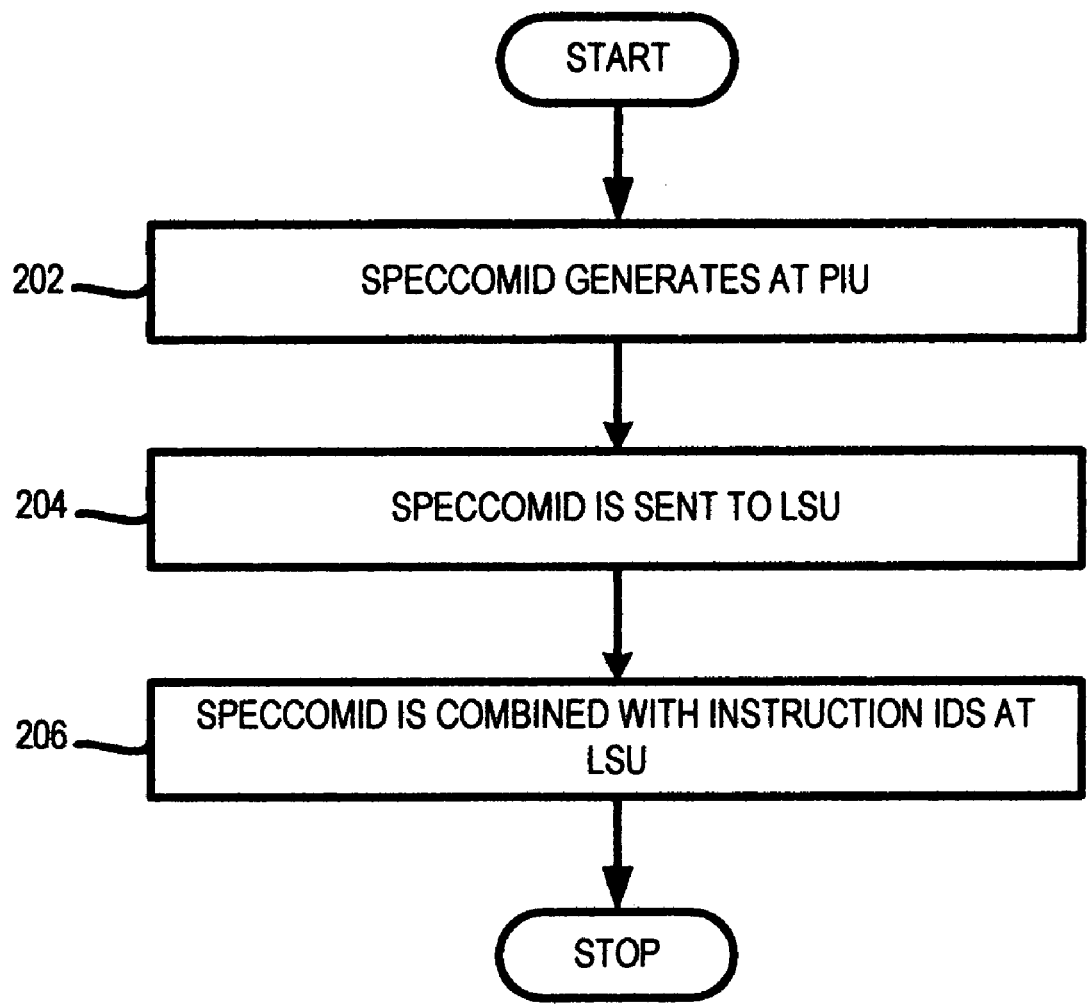
FIG. 2 shows, in an embodiment, a simple flow chart illustrating the high-level steps for generating an actual commit signal.

FIG. 2 shows, in an embodiment, a simple flow chart illustrating the high-level steps for generating an actual commit signal. At a first step 202, a commit speculation control signal (SpecComId) is generated at a Pipeline & Issuing Unit (PIU). As shown in FIG. 1 a PIU 42 generates a SpecComID that assumes all load or store instructions will not cause exceptions. At a next step 204, the SpecComID is sent to a Load Store Unit (LSU) 14. At a next step 206, the SpecComId is combined with the instruction Ids in the pipeline of LSU 14 to generate an actual commit signal (ComId) that is coupled and detectable by other processor units, including PIU 42.

Depending on what type of instructions is in the pipeline, SpecComID can be generated as early as stage Q 26 or as late as stage C 32. LSU or Exc Free instructions can be committed speculatively in stage Q 26 to move the commit speculation point up in processor pipeline 40. Exc Taking instructions commit speculatively in stage C 32 to move the commit speculation point down pipeline 40. Since Exc Taking instructions, or Non-LSU instructions, are rare in normal execution, the commit speculation point will tend to stay in stage Q 26.

The Staging Buffer

The above is implemented in the PIU 42 using an Instruction Staging buffer. FIGS. 3 and 4 show, in an embodiments, a simple flow chart illustrating the steps for generating a SpecComId and a ComId. In a preferred embodiment, at a first step 302, an instruction is issued at stage Q 26. At a next step 304, the instruction is written into the next entry in the Instruction Staging buffer using an incrementing write pointer identification, WrInstPtr. The instruction is tagged with this writer point identification so that the instruction and its information can be easily referenced in the buffer.

At a next step 306, the instruction is executed and completed. When the instruction completes, the instruction is written into the Staging buffer that it is done and reports if it caused any exceptions, at a next step 308. The incrementing commit speculation identification pointer, SpecComId, reads the next instruction in the buffer to be committed speculatively, at a next step 310. Before the instruction is committed speculatively, certain conditions have to be met. At a next step 312, if older instructions are still outstanding in the Staging buffer, then the older instructions have to be handled first, at a next step 314. If no older instructions are outstanding, then one of the following conditions have to be met, at next steps 316, 318, and 320:

Exception Free Instruction (Exc Free instr)

Load/Store Unit Instruction (LSU instr)

Instruction done with no exceptions (Instr w/o exc)

At a next step 322, the instruction is committed speculatively. When the instruction is committed speculatively, the commit speculation control signal, SpecComId, is incremented to include this instruction, at a next step 324. At a next step 326, the SpecComId is sent to the LSU which then generate a ComId for the oldest outstanding non-exception instruction in the LSU, at a next step 328. Once a ComID has been generated, the instruction has been committed, the register file has been updated, and all exceptions have been resolved. From a software point of view, the instruction has been finished and the ComID may be coupled to other processor unit, in a next step 346.

In stage W 34, there is an incrementing retire pointer. The instruction is retired if the following are true, at next steps 330, 332, and 334:

All older instruction have been retired

Instruction is done

Instruction has no exceptions

If conditions in step 330, 332, and 334 are met, then at a next step 336, the instruction is retired. If an instruction has an exception and it is the next instruction to be retired, that instruction's exception will be taken, at a next step 340. At a next step 342, the instruction with exception is retired.

In an embodiment, the system may check, at a next step 344, for additional instruction to be retired. If additional instructions are outstanding, then the method returns to steps 330 to continue the process of retiring instructions. In another embodiment, at a next step 338, the system checks to determine if new instruction has been issued. If new instruction has been issued, then the method returns to step 302 of FIG. 3 to continue the process.

When the commit speculation pointer matches the write pointer, all issued instructions have been committed speculatively. In an embodiment, if the SpecComId pointer does not match the write pointer, at a next step 324, then the method returns to step 310 to continue processing the instructions in the buffer.

When the retire pointer matches the write pointer, all issued instructions have been retired and committed into the architecture state. The retire pointer cannot pass the commit speculation pointer. The commit speculation pointer cannot pass the write pointer.

Generating and Using Instruction Commit

The actual instruction commit, ComId, is generated in the LSU. The PIU signal SpecComId indicates which instructions can be committed assuming no LSU data path exceptions. LSU 14 may combine SpecComID with the IDs of the outstanding LSU instructions and exceptions to determine which instructions can actually be committed. To do this LSU 14 may determine a commit ID taking into account possible no LSU data path exceptions. The algorithm is as follows:

OldestLSUId=Id of oldest outstanding LSU instruction

If the oldest ID instruction causes an exception, the LSU should keep that OldestLSUID until the exception is taken.

The actual commit ID is the smaller of the PIU's SpecComId and LSU's OldestLSUId-1:

ComId=min(SpecComId, OldestLSUId-1)

If there are no outstanding LSU instructions, ComId is equal to SpecComId. This has the effect of having the ComId include only the instructions that have not or will not cause an exception. All instructions with an instruction ID that is less then ComId can be committed to the architecture state. Any instruction that has not been committed when an exception is retired in the PIU 42, should be killed.

The equations below can be used to determine if ID A is older than ID B. IdPhase indicates if Id bit [4]=0 is older than Id bit [4]=1. This is used to handle the Id wrap around and reuse.

$A4 = IdPhase \wedge A[4] \& !B[4]$ $B4 = IdPhase \wedge !A[4] \& B[4]$ $A3 = A4 | (!B4 \& A[3] \& !B[3])$ $B3 = B4 | (!A4 \& !A[3] \& B[3])$ $A2 = A3 | (!B3 \& A[2] \& !B[2])$ $B2 = B3 | (!A3! A[2] \& B[2])$ $A1 = A2 | (!B2 \& A[1] \& !B[1]$ $B1 = B2 | (!A2 \& !A[1] \& B[1])$ $A0 = A1 | (!B1 \& A[0] \& !B[0])$ $B0 = B1 | (!A1 \& !A[0] \& B[0]$ AisOlder=A0

BisOlder=B0

Instr Commit with LSU Data Path and Data Cache

As part of the normal pipeline flow, the store would calculate the address, look up the TLB and tags and determine cache miss and exceptions. The actual write into the data cache would be delayed until after stage W 34 when the exceptions from all the data paths were combined and instruction commit was determined. Delaying the write into the data cache now means that the load and stores access the data cache at different points in the pipe. To avoid a coherency problem, store data needs to be bypassed or loads following a store will need to be stalled.

Since in almost all non-LSU instructions executed in normal code are Exception Free, the PIU is able to give a non-LSU commit speculation, SpecComId, in the LSU's stage E 28 in most cases. For LSU instructions that will modify the LSU architecture state (e.g. data cache writes, TLB Ops), the LSU can stall in stage E 28 until SpecComId indicates that it is safe to commit the instruction. For instructions that do not modify the LSU architecture state, LSU 14 will not stall and will return data and exceptions to PIU 42. Since LSU 14 will know its exceptions long before PIU 42, LSU 14 will need to maintain a precise exception model for the LSU instructions in its own pipeline. If an LSU instruction causes an exception, LSU 14 must make sure all younger LSU instructions do not modify the LSU architecture state until PIU 42 is able to kill all younger instructions.

Instr Commit with the MAcc Data Path's Hi/Lo Registers

A multiply-accumulate (MAcc) 62 data path has two architecture registers, the Hi/Lo register pair. Since architecture state cannot be modified until the committed (i.e. committed to the architecture state of the machine), the MAcc data path does not write the Hi/Lo registers until the ComID indicates the instruction has been committed. Once the instruction is ready to update the Hi/Lo registers in the MAcc data path, the instruction will stall until ComId indicates the instruction is committed. The instruction stall may also stall any MAcc 62 pip instruction in stages D and E that need to use the values of Hi/Lo.

Accordingly, a more efficient and higher performance load/store centric exception handling method and system is provided in accordance with the principles of this invention to thereby increase processor performance in out of order execution processors. Fewer pipeline kills are required thereby improving instruction handling timing. Simplification of the load/store unit is allowed since the load/store until is allowed to commit instruction's effects to the architecture state prior to its instruction execution.

Foregoing described embodiments of the invention are provided as illustrations and descriptions. They are not intended to limit the invention to precise form described. For example, the number of bits recited for the signals identified herein are provided to illustrate and facilitate describing the inventive concepts. In particular, it is contemplated that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A load/store centric exception processing method in a microprocessor employed in executing a plurality of instructions as part of a computing system comprising the steps of:
   issuing the plurality of instructions at a first pipeline state, the plurality of instructions including a plurality of exception free instructions and a plurality of exception taking instructions;
   completing each of the plurality of instructions;
   committing speculatively each of the plurality of instructions at a second pipeline stage when any of a first plurality of conditions is true such that only the plurality of exception free instructions are committed speculatively:
   generating an actual commit (ComId) for each of the plurality of exception free instructions selected by the committing speculatively, each ComId including a commit speculation control signal (SpecComId) and one of the plurality of identification for one of the plurality of exception free instructions;
   retiring the plurality of exception free instructions at a third pipeline stage when any of a second plurality of conditions is true;
   taking the plurality of exception taking instructions at the third pipeline stage; and
   retiring the plurality of exception taking instructions at the third pipeline stage.

2. The method of claim 1 wherein the first plurality of conditions comprises:
 for each of the plurality of instructions, the instruction is an exception free instruction;
 for each of the plurality of instructions, the instruction is a Load/Store Unit (LSU) instruction; and
 for each of the plurality of instructions, the instruction is a done without exceptions instruction.

3. The method of claim 1 wherein the second plurality of conditions comprises:
 for each of the plurality of exception free instructions, all older instructions have been retired; and
 for each of the plurality of exception free instructions, the exception free instruction is done.

4. The method of claim 3 wherein the issuing the plurality of instructions further includes:
 writing the plurality of instructions into an instruction staging buffer; and
 tagging each of the plurality of instructions with a write pointer.

5. The method of claim 4 wherein the completing each of the plurality of instructions further includes:
 writing to the instruction staging buffer that one of the plurality of instructions is complete; and
 reporting, if any, an exception corresponding to the one of the plurality of instructions.

6. The method of claim 1 wherein the first pipeline stage is a Q stage.

7. The method of claim 1 wherein the second pipeline stage is selected from the group consisting of: a Q stage, an E stage, a D stage and a C stage.

8. The method of claim 1 wherein the third pipeline stage is a W stage.

9. The method of claim 1 wherein the SpecComId is generated by a Pipeline & Issuing Unit (PIU).

10. The method of claim 1 wherein the ComId is generated by the LSU.

* * * * *